United States Patent
Ouellette et al.

(10) Patent No.: US 11,191,053 B1
(45) Date of Patent: Nov. 30, 2021

(54) NETWORK-BASED CLOCK FOR TIME DISTRIBUTION ACROSS A WIRELESS NETWORK

(71) Applicant: Facebook, Inc., Menlo Park, CA (US)

(72) Inventors: Michel Ouellette, Los Altos, CA (US); Brett Eric Schein, Mountain View, CA (US); Brian Dunn, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/986,873

(22) Filed: Aug. 6, 2020

(51) Int. Cl.
*H04W 56/00* (2009.01)

(52) U.S. Cl.
CPC ..... *H04W 56/007* (2013.01); *H04W 56/0015* (2013.01)

(58) Field of Classification Search
CPC ........... H04W 56/007; H04W 56/0015; H04W 72/0446; H04B 7/2618
USPC ........................................................ 370/336
See application file for complete search history.

(56) References Cited

U.S. PATENT DOCUMENTS

| | | | |
|---|---|---|---|
| 7,151,945 B2 | 12/2006 | Myles et al. | |
| 8,300,165 B2 | 10/2012 | Copeland et al. | |
| 8,806,063 B1 * | 8/2014 | Kamath | G06F 1/12 709/248 |
| 9,698,926 B2 | 7/2017 | Zampetti | |
| 9,787,461 B1 * | 10/2017 | Zigelboim | H04L 43/0864 |
| 2003/0016067 A1 * | 1/2003 | Wilson | G06F 1/10 327/291 |
| 2007/0025481 A1 | 2/2007 | Ryu et al. | |
| 2008/0089364 A1 * | 4/2008 | Barry | H04L 47/564 370/517 |
| 2008/0232344 A1 * | 9/2008 | Basu | G01D 21/00 370/350 |
| 2009/0323669 A1 | 12/2009 | Salonidis et al. | |
| 2014/0079409 A1 * | 3/2014 | Ruffini | H04J 3/0667 398/154 |
| 2017/0257836 A1 * | 9/2017 | Ho | H04L 7/0004 |
| 2019/0245690 A1 * | 8/2019 | Shah | H04L 63/123 |
| 2019/0356466 A1 * | 11/2019 | Kratz | H04W 56/002 |
| 2020/0280383 A1 * | 9/2020 | Herber | H04J 3/0638 |

* cited by examiner

Primary Examiner — Robert J Lopata
(74) Attorney, Agent, or Firm — Brian R. Short

(57) ABSTRACT

Apparatuses, methods, and systems for a network-based clock for time distribution across a wireless network, are disclosed. One system includes a network that includes a time distributor, a time receiver, and a plurality of network elements providing one or more network connections between the time distributor and the time receiver. The plurality of network elements includes an ingress network element and an egress network element. The time distributor receives and synchronizes to a first clock. Two or more of the plurality of network elements receives and synchronize to a second clock. A forward network transit delay is determined between the ingress network element and the egress network element and a backward network transit delay is determined between the egress network element and the ingress network element. The time receiver time synchronizes to the time distributor using the forward network transit delay and the backward network transit delay.

20 Claims, 12 Drawing Sheets

The time distributor and the time receiver performing handshake operations to establish communication

610

The time distributor and the time receiver initiating the synchronization process

620

The network elements located between the time distributor and the time receiver calculating the NTD (forward and backward) related information using the second clock (RefB) and providing the NTD related information to the network controller

630

The controller maintaining the reported NTD related information and statistics, selecting the propagation (routing) paths for the timing packets, and sharing selected timing paths with the time receiver

640

The time receiver using the generated NTD related information for synchronizing with the time distributor

The controller detecting or the controller being alerted by a network element of the failure of a network element or a link

710

The controller attempting to identify an available alternate path around the failed network element or link

720

The controller selecting the best path available for timing packets for enabling synchronization between the time distributor and the time receiver

730

Proceeding to normal operating mode as depicted in Figure 6

```
┌─────────────────────────────────────────────────────────────────┐
│ The controller detecting or the controller being alerted by a   │
│ network element of the failure or degradation of second clock   │
│ or rogue clock                                                  │
│                           910                                   │
└─────────────────────────────────────────────────────────────────┘
                                │
                                ▼
┌─────────────────────────────────────────────────────────────────┐
│   Synchronization with peer network element is activated and    │
│                            initiated                            │
│                              920                                │
└─────────────────────────────────────────────────────────────────┘
```

┌──────────────────────────────┐      ┌──────────────────────────────┐
│ Controller Instructs the     │      │ Network Element engages in   │
│ network element to engage    │      │ peer discovery,              │
│ in peer synchronization and  │      │ synchronization and decides  │
│ decides time master and      │      │ time master and time follower│
│ time follower                │      │                              │
│             930              │      │             940              │
└──────────────────────────────┘      └──────────────────────────────┘

```
┌─────────────────────────────────────────────────────────────────┐
│       Proceeding to normal operating mode as depicted in        │
│                            Figure 6                             │
│                              950                                │
└─────────────────────────────────────────────────────────────────┘
```

FIGURE 9

NTD_BA

Providing, by a plurality of network elements, one or more network connections between a time distributor and a time receiver, the plurality of network elements including an ingress network element and an egress network element

1210

Receiving and synchronizing, by the time distributor, to a first clock

1220

Receiving and synchronizing, by two or more of the plurality of network elements, to a second clock

1230

Determining a forward network transit delay between the ingress network element and the egress network element

1240

Determining a backward network transit delay between the egress network element and the ingress network element

1250

Time synchronizing the time receiver to the time distributor using the forward network transit delay and the backward network transit delay

NETWORK-BASED CLOCK FOR TIME DISTRIBUTION ACROSS A WIRELESS NETWORK

FIELD OF THE DESCRIBED EMBODIMENTS

The described embodiments relate generally to wireless communications. More particularly, the described embodiments relate to systems, methods and apparatuses for a network-based clock for time distribution across a wireless network.

BACKGROUND

The air interface spectrum of a 4G and 5G wireless system is premium. Operators pay (or have paid) large sum of money to acquire portions of licensed spectrum. Further, the cost to deliver information in 4G and 5G systems is very high. Optimizing bit delivery in 4G and 5G systems is of high value to Mobile Operators. One way to optimize such system and make it more efficient is to make the system synchronous in terms of frequency and time/phase.

Current 4G and 5G base stations require recovering phase/time across an access packet network with a time accuracy of +/−1.5 microseconds and frequency accuracy of +/−50 parts-per-billion. Solutions to meet such requirements are extremely challenging to implement, deploy and operate. These requirements are well documented in 3GPP specifications.

In the past few years, Mobile Operators have demanded and placed significant emphasis on OEM equipment vendors (for example, router/switch companies) to deliver solutions for frequency/phase/time distribution across various access network technologies (for example, GPON, V-band, E-band, fiber, etc.)

It is desirable to have methods, apparatuses, and systems for a network-based clock for time distribution across a wireless network.

SUMMARY

An embodiment includes a network. The network includes a time distributor, a time receiver, and a plurality of network elements providing one or more network connections between the time distributor and the time receiver. The plurality of network elements includes an ingress network element and an egress network element. The time distributor receives and synchronizes to a first clock. Two or more of the plurality of network elements receives and synchronize to a second clock. A forward network transit delay is determined between the ingress network element and the egress network element and a backward network transit delay is determined between the egress network element and the ingress network element. The time receiver time synchronizes to the time distributor using the forward network transit delay and the backward network transit delay.

Another embodiment includes a method. The method includes providing, by a plurality of network elements, one or more network connections between a time distributor and a time receiver, the plurality of network elements including an ingress network element and an egress network element, receiving and synchronizing, by the time distributor, to a first clock, receiving and synchronizing, by two or more of the plurality of network elements, to a second clock, determining a forward network transit delay between the ingress network element and the egress network element, determining a backward network transit delay between the egress network element and the ingress network element, and time synchronizing the time receiver to the time distributor using the forward network transit delay and the backward network transit delay.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of synchronizing the time receiver with the time distributor in a normal operating mode, according to an embodiment.

FIG. 7 is a flow chart that includes steps of a method of synchronizing the time receiver with the time distributor in a failure mode, wherein the failure includes failure of a network element or a link of the network, according to an embodiment.

FIG. 9 is a flow chart that includes steps of a method of synchronizing the time receiver with the time distributor in a failure mode, wherein the failure includes clock degradation, a clock loss, or a rogue element, according to an embodiment.

FIG. 12 is a flow chart that includes steps of a method of time distribution across a wireless network, according to an embodiment.

DETAILED DESCRIPTION

The embodiments described include methods, apparatuses, and systems for a network-based clock for time distribution across a wireless network.

Figure 1:
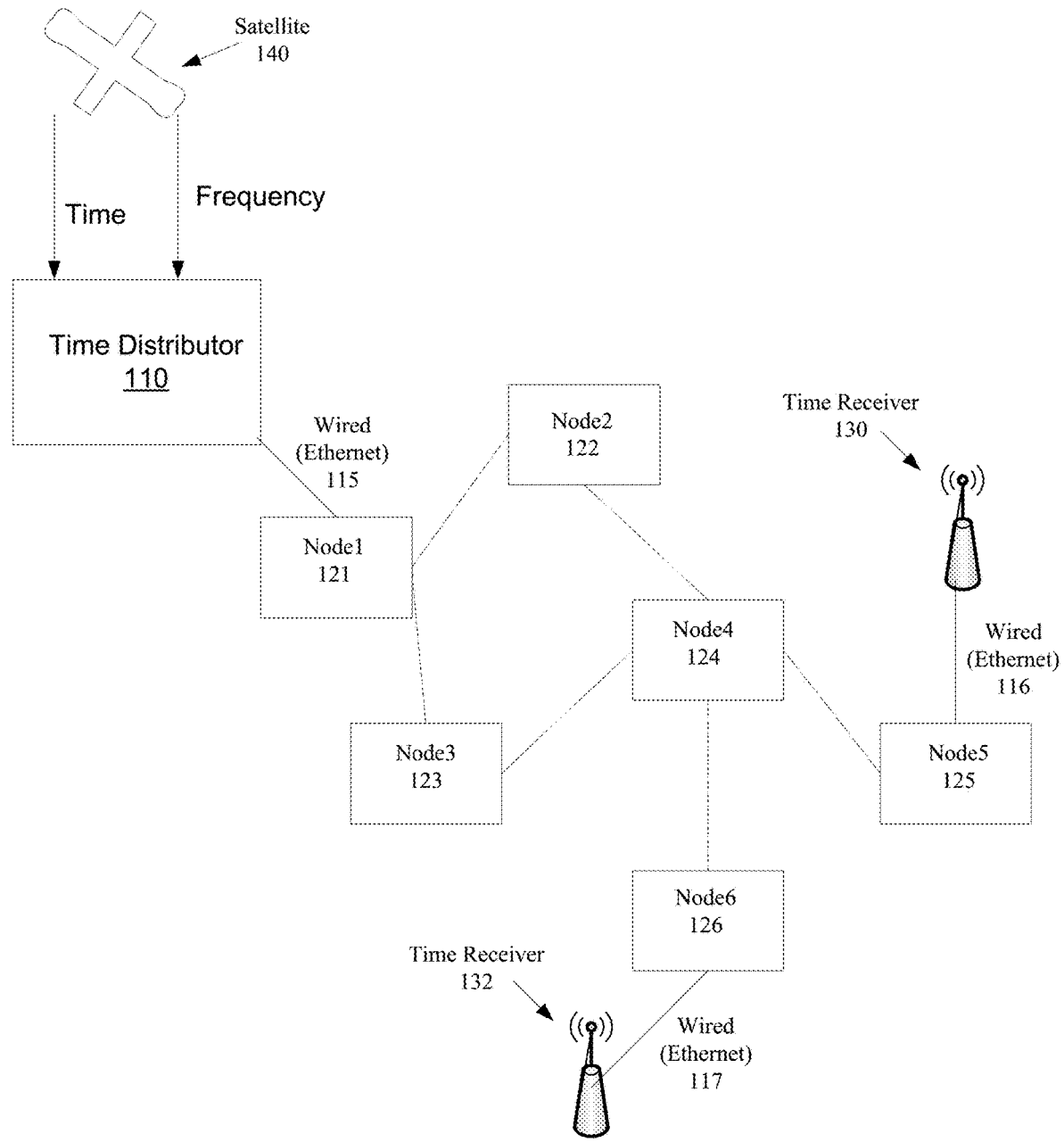
FIG. 1 shows a wireless mesh network that includes a time distributor and a plurality of downstream transceivers, according to an embodiment.

FIG. 1 shows a wireless mesh network that includes a time distributor 110 and a plurality of downstream time receivers 130, 132, according to an embodiment. It is desirable to maintain time and frequency synchronization between the time distributor 110 and the plurality of downstream time receivers 130, 132. As shown, the time distributor 110 may be wire connected (for example, through an Ethernet connection 115) to a first node 121 of a wireless mesh network. Further, communication is maintained between the time distributor 110 and the plurality of downstream time receivers 130, 132 through nodes 121, 122, 123, 124, 125, 126 of the wireless mesh network. The downstream time receivers 130, 132 may be wire connected (for example, through Ethernet connections 116, 117) to nodes 125, 126 of the wireless mesh network. The time distributor 110 may obtain a timing reference by receiving, for example, a clock from a satellite 140 (for example, a GPS (global positioning satellite).

Figure 2:
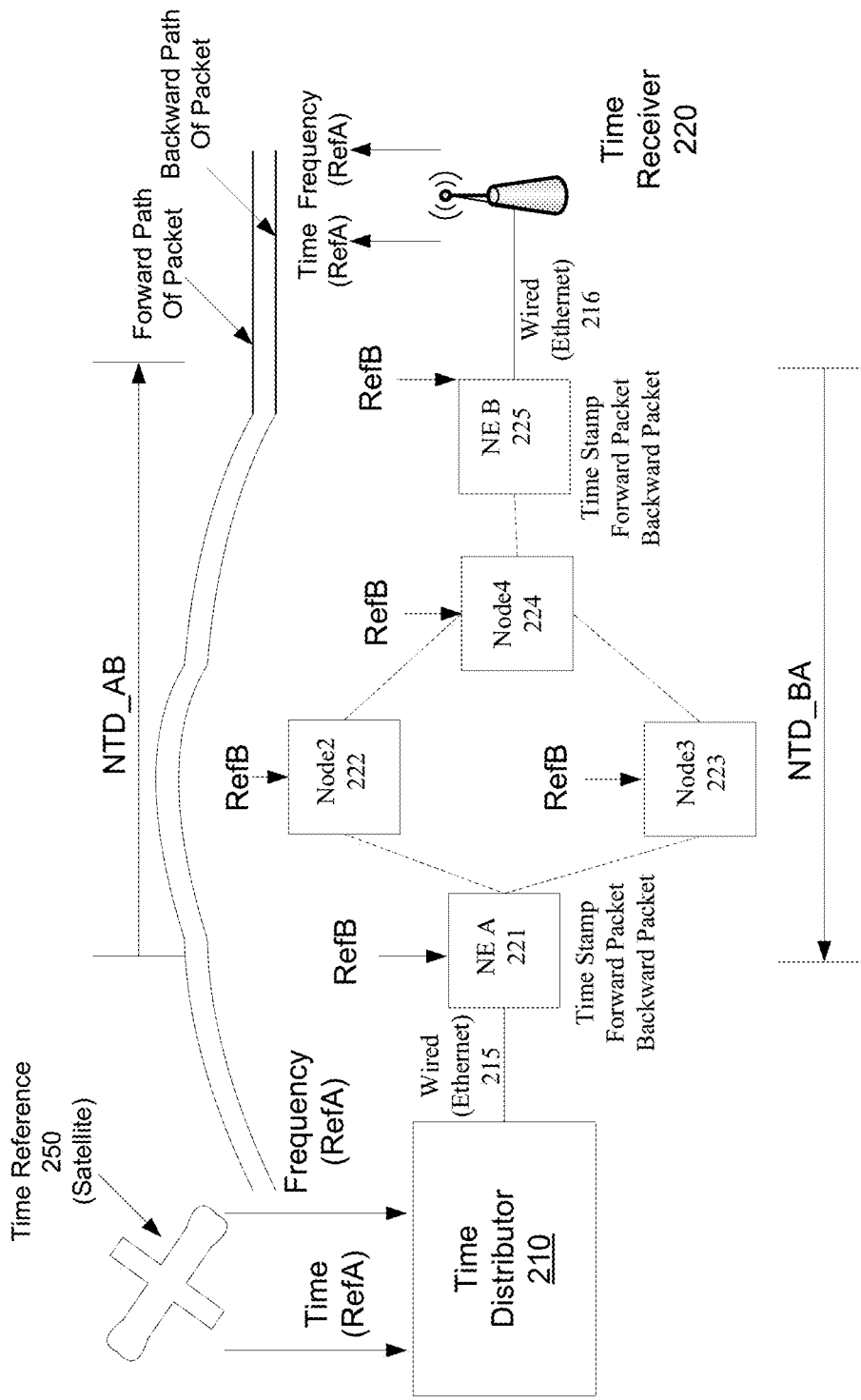
FIG. 2 shows a wireless mesh network that includes a time distributor and a time receiver, wherein the time receiver is synchronized to the time distributor, according to an embodiment.

FIG. 2 shows a wireless mesh network that includes a time distributor 210 and a time receiver 220, wherein the time receiver 220 is synchronized to the time distributor 210, according to an embodiment. For an embodiment, the time distributor 210 receives a first clock from a time reference 250 (for example, a signal of a navigational satellite). The time distributor synchronizes to a first clock that provides a time and frequency reference (RefA).

As shown, a plurality of network elements 221, 222, 223, 224, 225 provide one or more network connections between the time distributor 210 and the time receiver 220, the plurality of network elements including an ingress network element (NE A) 221 and an egress network element (NE B) 225. For an embodiment, the time distributor 210 is connected through, for example, wired Ethernet 215 to the ingress network element (NE A) 221. Further, the time receiver 220 is connected through, for example, wired Ethernet 216 to the egress network element (NE B) 225.

For an embodiment, the time distributor 210 receives and synchronizes to the first clock (RefA), and two or more of the plurality of network elements receive and synchronize to a second clock (RefB). For an embodiment, the common clock RefB is available and receivable throughout the plurality of network elements. For situations in which a common clock RefB is not available through the plurality of network elements, various statistical techniques can be used to estimate the network transit delay in both directions. For some embodiments, the techniques to calculate the network transit delays are implemented in the time receiver itself. The time receiver does so by sampling each timing packet that is sent across the network (that is, from NE_A to NE_B) from the time distributor to time receiver (and vice-versa). Using filtering techniques, the time receiver tries to identify packets that have traversed the network with minimal delay. These packets can be referred to as 'lucky packets', and identifying these lucky packets allow the time receiver to use them to perform time synchronization with the time distribution. These 'lucky packets' are those that have traversed the network with minimal delay, and are therefore a deterministic quantity. From time receiver/distribution point of view, lucky packets appear as if the network has constant and deterministic delay. However, identifying these packets requires additional circuitry in the time receiver, requires the implementation of sophisticated filtering techniques that can cope with all kinds of network impairments, and also requires a very stable and high cost oscillator in the time receiver. For at least some of the described embodiments, the implementation of the time receiver is less complex and does not need sophisticated filtering techniques given that the network transit delays are accurately calculated and available to the time receiver for the purpose of time synchronization. This is actually possible because each NE has access to a common clock reference (RefB).

As previously described, the first clock (RefA) may be received through reception of a navigational (such as, GPS) satellite signals. For an embodiment, the RefB of the second clock is based on a GNSS (Global Navigation Satellite System), or a GPS signal.

For at least some embodiments, the second clock (RefA) at Time Distributor 210 can be any sort reference (such as, GPS, wristwatch, Atomic clock). The RefA does not need to be accurate and precise, although it is recommended.

For at least some embodiments, the second clock (RefB) available to networks elements 221, 222, 223, 224, 225 can also be any reference. Practically, RefB may be GNSS/GPS because in the described embodiments include providing the same clock reference to all network elements 221, 222, 223, 224, 225. For at least some embodiment, the second clock (RefB) needs to be accurate and precise (as opposed to the first clock (RefA). For at least some embodiments, the second clock (RefB) is as accurate, or is more accurate than the first clock (RefA).

The described embodiments provide for distributing and recovering an arbitrary phase/time reference A (RefA) of the first clock across the network that is synchronized to another phase/time reference (RefB) of the second clock. This includes distributing the reference RefA between two reference points (from Time Distributor 210 to Time Receiver 220) that are geographically separated by the network that consists of several network elements and wireless links between the network elements. For an embodiment, the RefA of the first clock is an arbitrary frequency/phase/time reference. Further, each network element is traceable to the network-wide reference B (RefB) of the second clock.

For at least some embodiments, a forward network transit delay (NTD_AB) is determined between the ingress network element (NE A) 221 and the egress network element (NE B) 225 and a backward network transit delay (NTD_BA) is determined between the egress network element (NE B) 225 and the ingress network element (NE A) 221. The forward network transit delay (NTD_AB) represents the time it takes a packet to propagate through the wireless network from the ingress network element (NE A) 221 to egress network element (NE B) 225, and the backward network transit delay (NTD_BA) represents the time it takes a packet to propagate through the wireless network from the egress network element (NE B) 225 to the ingress network element (NE A) 221.

For at least some embodiments, the time receiver time 220 synchronizes to the time distributor 210 using the forward network transit delay (NTD_AB) and the backward network transit delay (NTD_BA).

Synchronizing the Time Receiver to the Time Distributor

For at least some embodiments, the time receiver 220 is programmed with an address of the time distributor 210. For an embodiment, the time receiver 220 establishes communication through a handshake procedure with the time distributor 210. As described, for an embodiment, the time distributor 210 sends a timing packet to the time receiver 220, wherein the timing packet is timestamped at departure t1 at the time distributor 210 and timestamped at arrival t2 at the time receiver 220. Further, as described, for an embodiment, the time receiver 220 sends a timing packet to the time distributor 210, wherein the timing packet is timestamped at departure t3 at the time receiver 220 and timestamped at arrival t4 at the time distributor 210. For at least some embodiments, the timing packets are sent as unicast packets and can be sent across Ethernet, IPv4, IPv6, or MPLS wireless networks. For an embodiment, the time receiver 220 is provided with the 4 timestamp values (t1, t2, t3, t4). Based on the timestamp values (t1, t2, t3, t4) the time receiver 220 operates to calculate a time offset (offset between the first clock (RefA) at the time receiver 220 and the first clock (RefA) at the time distributor 210), and a time delay (the forward and backward network transit delays (NTDs) with the time distributor 210. For an embodiment, these steps are accomplished utilizing two-way transfer methods. The time offset and the time delay are minimally required for the time receiver 220 to acquire time synchronization with the time distributor 210. General formulas for calculating the time delay and the time offset include the time delay=[(t2−t1)+(t4−t3)]/2, and time offset=(t2−t1)−time delay. For an embodiment, the time receiver 220 adjusts its clock and synchronizes with the time distributor 210 based on the time delay and time offset calculations and the embedded timestamp values.

For at least some embodiments, the forward network transit delay (NTD_AB) is determined by calculating a time difference between a first ingress time stamp (time stamp of forward packet at the ingress network element) of the ingress network element (NE A) 221 and a first egress time stamp (time stamp of the forward packet at the egress network element) of the egress network element (NE B) 225. Further, for at least some embodiments, the backward network transit delay (NTD_BA) is determined by calculating a time difference between a second egress time stamp (time stamp of the backward packet at the egress network element) of the egress network element (NE B) 225 and a second ingress time stamp (time stamp of the backward packet at the ingress network element) of the ingress network element (NE A) 221.

For at least some embodiments, determining the time difference between the first ingress time stamp of the ingress network element (NE A) 221 and the first egress time stamp of the egress network element (NE B) 225 includes the time distributor 210 communicating a packet to the ingress network element (NE A) 221 and of the plurality of network elements. The ingress network element (NE A) 221 then time stamps the packet with the ingress time stamp based on the second clock (Ref B). The packet with the ingress time stamp is then communicated to the egress network element (NE B) 225. The egress network element (NE B) 225 generates the egress time stamp based on the second clock (Ref B). For an embodiment, the timing difference (NTD_AB) is determined based on the first ingress time stamp and the first egress time stamp.

For at least some embodiments, determining a backward network transit delay (backward NTD_BA) includes determining the time difference between the second egress time stamp of the egress network element (NE B) 225 and the second ingress time stamp of the ingress network element (NE A) 221 includes the time receiver 220 sending a packet and the egress network element (NE B) 225 time stamping the packet with the second egress time stamp based on the second clock (Ref B). The packet with the second egress time stamp is communicated to the ingress network element (NE A) 221. The ingress network element (NE A) 221 of the plurality of network elements generates the second ingress time stamp based on the second clock. The second ingress time stamp is included in the packet which is communicated to the time distributor 210. For an embodiment, the timing difference (NTD_BA) is determined based on the second egress time stamp and second ingress time stamp.

As described, the distribution of first clock (refA) is performed using, for example, a 2-way time transfer scheme (forward and backward time stamped packets), consisting of at least 4 timestamps (first ingress time stamp, first egress time stamp, second ingress time stamp, second egress time stamp) that are exchanged using packets across network paths. The distribution also takes into account the time the packets spend propagating across the network (that is, across the set of network elements and links), from ingress network element to the egress network element of the network. Obtaining this time (forward and backward network transit delays) is possible given that a network-wide reference (second clock (refB)) is available at each network element. Based on the at least 4 timestamps, the Time Receiver 220 synchronizes to the Time Distributor 210 (that is, the first clock (refA) of the Time Receiver 220 is synchronized to the first clock (refA) of the Time Distributor 210).

Figure 3:
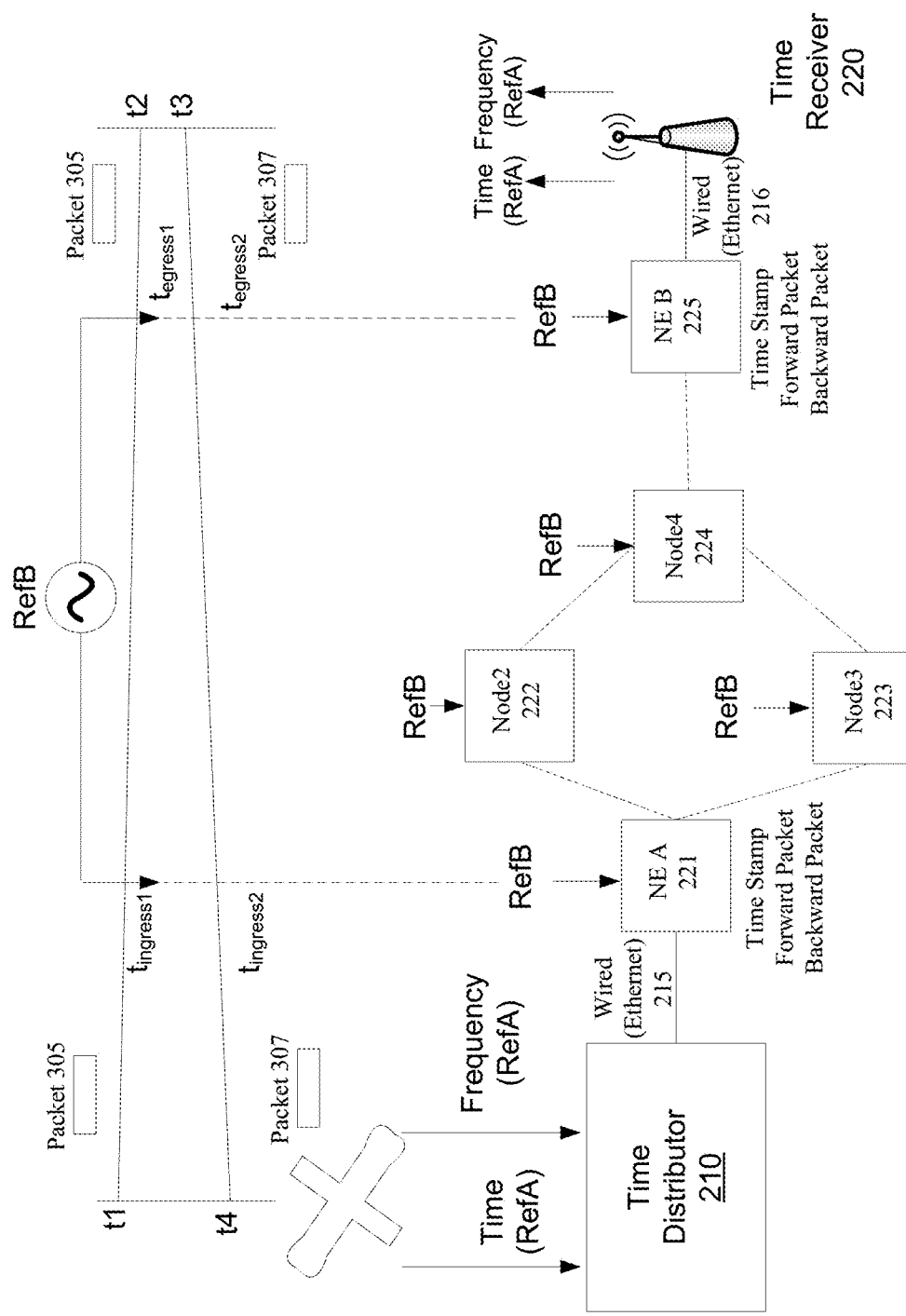
FIG. 3 shows a wireless mesh network that includes a time distributor and a time receiver, and shows a sequence of packet propagation generated by the time distributor and time receiver across the wireless mesh network, according to an embodiment.

FIG. 3 shows a wireless mesh network that includes a time distributor and a time receiver, and shows a sequence of packet propagation generated by the time distributor and time receiver across the wireless mesh network, according to an embodiment. At time t1 a packet 305 is transmitted from the time distributor 210 having the time receiver 220 as the destination of the packet 305. The ingress network element (NE A) 221 receives the packet 305 and time stamps the packet 305 with the first ingress time stamp ($t_{ingress1}$). The packet 305 is then communicated through the nodes of the wireless mesh network to egress network element (NE B) 225. The egress network element (NE B) 225 receives the packet 305 and time stamps the packet 305 with the first egress time stamp ($t_{egress1}$). At time t2, the time receiver 220 receives the packet 305. The forward network transit delay is determined based on the time different between the first ingress time stamp ($t_{ingress1}$) and the first egress time stamp ($t_{egress1}$).

At time t3 a packet 307 is transmitted from the time receiver 220 having the time distributor 210 as the destination of the packet 307. The egress network element (NE B) 225 receives the packet 307 and time stamps the packet 307 with the second egress time stamp ($t_{egress2}$). The packet 307 is then communicated through the nodes of the wireless mesh network to the ingress network element (NE A) 221. The ingress network element (NE A) 221 receives the packet 307 and time stamps the packet 307 with the second ingress time stamp ($t_{ingress2}$). At time t4, the time distributor 210 receives the packet 307. Note that the term "ingress" and "egress" are used based on the relative orientation of the time distributor and the time receiver, not based on the direction of the packets 305, 307. The backward network transit delay is determined based on the time different between the second egress time stamp ($t_{egress2}$) and the second ingress time stamp ($t_{ingress2}$). As shown, the ingress network element (NE A) 221 and the egress network element (NE B) 225 maintain synchronization with the RefB.

Figure 4:
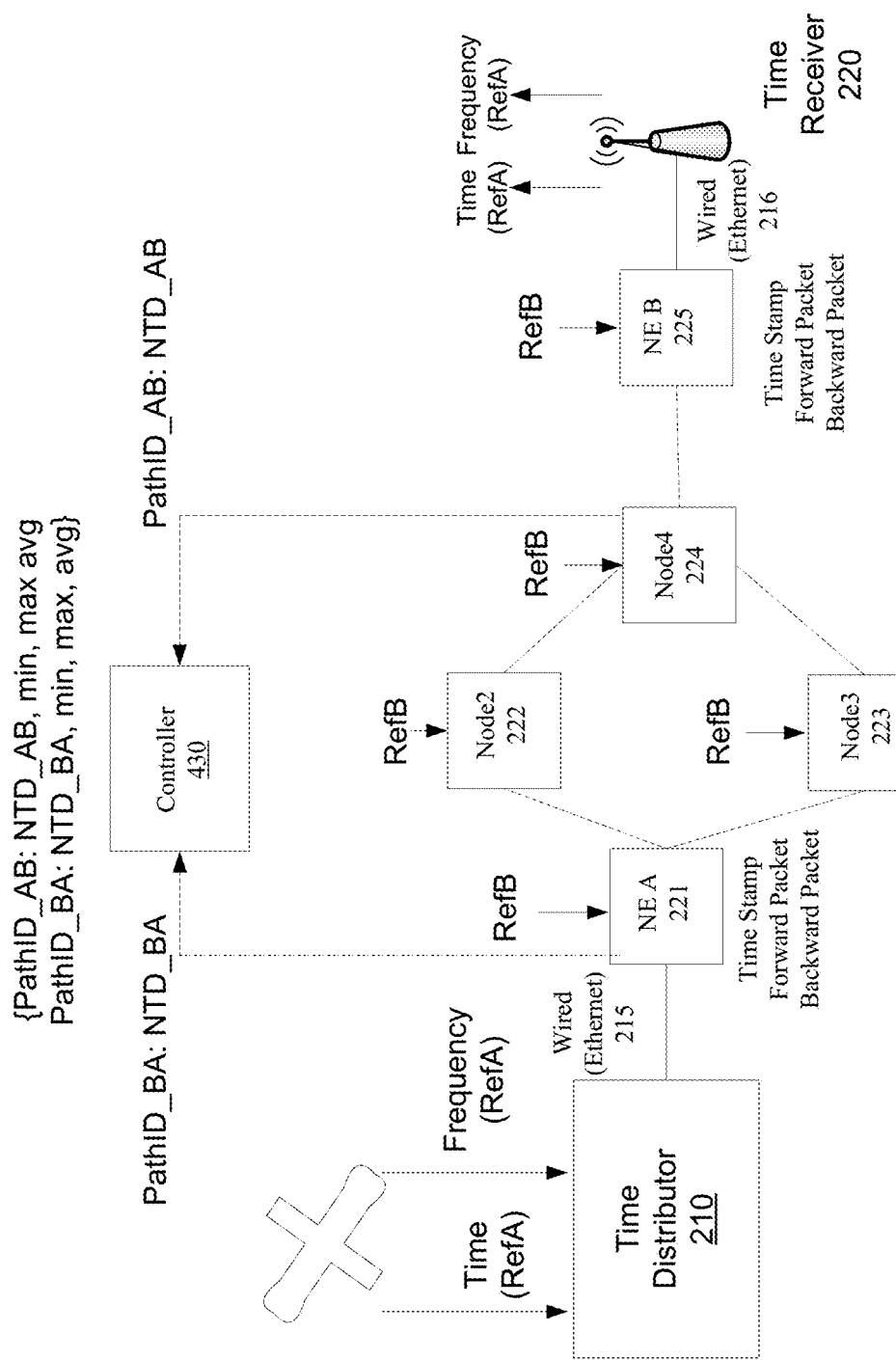
FIG. 4 shows a wireless mesh network that includes a time distributor, a time receiver, and a controller, wherein the controller maintains statistics of the propagation paths across the network such as delay, according to an embodiment.

FIG. 4 shows a wireless mesh network that includes a time distributor 210, a time receiver 220, and a controller 430, wherein the controller 430 maintains statistics of the propagation paths across the network such as delay, according to an embodiment.

For an embodiment, the controller 430 is operative to receive a plurality of forward transit delays and receive a plurality of backward transit delays. That is, the forward transit delays and the backward delays are monitored over time and provided to the controller 430. The monitoring can be over time periods or continuously running over time. The information associated with the forward transit delays and the backward transit delays can include a path identifier of each path associated with the forward transit delays and the backward transit delays.

For an embodiment, the controller 430 is operative to maintain statistics of the plurality of forward transit delays and the plurality of backward transit delays. For at least some embodiment, the statistics maintained by the controller include at least a forward path identification, a minimum forward transit delay, a maximum forward transit delay, an average forward transit delay, backward path identification, a minimum backward transit delay, a maximum backward transit delay, and/or an average backward transit delay.

For at least some embodiments, based on the statistics maintained by the controller 430, the controller 430 is provided with visibility into the NTD (network transit delays) for all possible paths between the time distributor and the time receiver. Therefore, the controller 430 is able to make informed decision on which path to use for the time synchronization. For at least some embodiments, the controller selects paths (both the forward and backward paths) based on several criteria, such as, highest availability, lowest latency, least amount of asymmetry, least variability. For at least some embodiments, the path selection criteria are set up as policies in the controller 430. As stated, the controller operates to make informed decisions on how to propagate timing packets from time distributor to time receive within the network. For example, the controller 430 can code the path that the timing packets will take through the network. For an embodiment, the controller 430 can use schemes, such as, segment routing. For example, timing packets can take a first forward path and return on a second path. For an embodiment, the controller 430 has full control over the selection of the propagation path of the timing packets. For an embodiment, the controller 430 does not rely on a routing path engine. For an embodiment, the path of the timing packets can be different than a path of data packets. As described, the forward and backward paths of the timing packets between the time distributor and the time receive can be the same of disjointed (different).

Figure 5:
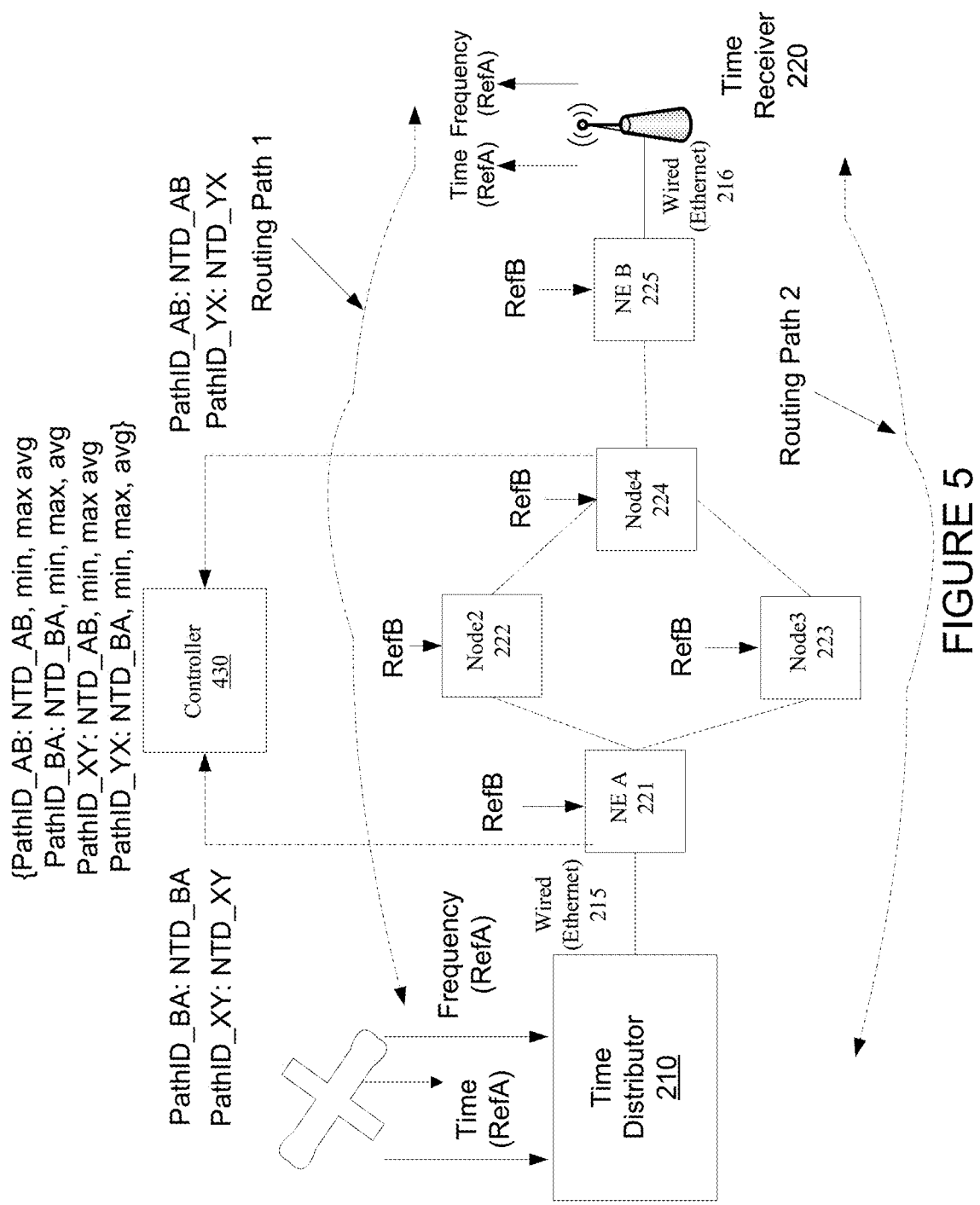
FIG. 5 shows a wireless mesh network that includes a time distributor, a time receiver, and a controller, wherein the controller selects routing paths between the time distributor and the time receiver, according to an embodiment.

FIG. 5 shows a wireless mesh network that includes a time distributor 210, a time receiver 220, and a controller 430, wherein the controller 430 selects routing paths between the time distributor 210 and the time receiver 220, according to an embodiment.

For an embodiment, the controller 430 is further operative to receive the plurality of forward transit delays for a plurality of paths between the ingress network element and the egress network element. That is, a first routing path (Routing Path 1) includes the network elements 221, 222, 224, 225, whereas a second routing path (Routing Path 2) includes the network elements 221, 223, 224, 225. Each of the different routing paths will have forward transmit delays which are each monitored over time.

Further, for an embodiment, the controller 430 is further operative to receive the plurality of backward transit delays for a plurality of paths between the egress network element and the ingress network element. Each of the different routing paths will have backward transmit delays which are each monitored over time. Note that the paths of the forward transmit delays may be different than the paths of the backward transmit delays.

For the descriptions here, a path is defined as a set of network elements and links between two or more end points network elements. The information communicated across the path includes the packets (that is, the packets that carry the timestamps) used by the time receiver and time distribution for the purpose of synchronization. However, the paths can also be used for communicating other information such as voice, data, sms, etc.

For an embodiment, the controller 430 is further operative to select forward and backward paths between the ingress network element and the egress network element based on at least one of the maintained statistics of the plurality of forward transit delays and the plurality of backward transit delays for the plurality of paths between the ingress network element and the egress network element and the plurality of paths between the egress network element and the ingress network element. The selected forward path can be different than the selected backward path. For at least some embodiments, the maintained statistics include one or more of a minimum forward transit delay, a maximum forward transit delay, a minimum backward transit delay, a maximum backward transit delay, path availability, forward transit delay variability, a backward transit delay variability. For at least some embodiments, a combination of the statistics allows for reduction or minimization of the difference in delay and delay variability between forward and backward paths.

It is to be understood that for some embodiments, the forward path is disjointed from the backward path. That is, the path followed by packets propagating from a first network element A 221 to a second network element B 225 can be different than the path followed by packet propagating from the second network element B 225 to the first network element A 221.

FIG. 6 is a flow chart that includes steps of a method of synchronizing the time receiver with the time distributor in a normal operating mode, according to an embodiment. A first step 610 includes the time distributor and the time receiver performing handshake operations to establish communication. A second step 620 includes the time distributor and the time receiver initiating the synchronization process. For an embodiment, this includes the transmission of timing packets. A third step 630 includes the network elements located between the time distributor and the time receiver calculating the NTD (forward and backward) related information using the second clock (RefB) and providing the NTD related information to the network controller. A fourth step 640 includes the controller maintaining the reported NTD related information and statistics, selecting the propagation (routing) paths for the timing packets, and sharing selected timing paths with the time receiver. A fifth step 650 includes the time receiver using the generated NTD related information for synchronizing with the time distributor.

FIG. 7 is a flow chart that includes steps of a method of synchronizing the time receiver with the time distributor in a failure mode, wherein the failure includes failure of a network element or a link of the network, according to an embodiment. A first step 710 includes the controller detecting or the controller being alerted by a network element of the failure of a network element or a link. A second step 720 includes the controller attempting to identify an available alternate path for the timing packets around the failed network element or link. A third step 730 includes the controller selecting the best path available for the timing packets for enabling synchronization between the time distributor and the time receiver. A fourth step 740 includes proceeding to normal operating mode as depicted in FIG. 6.

Figure 8:
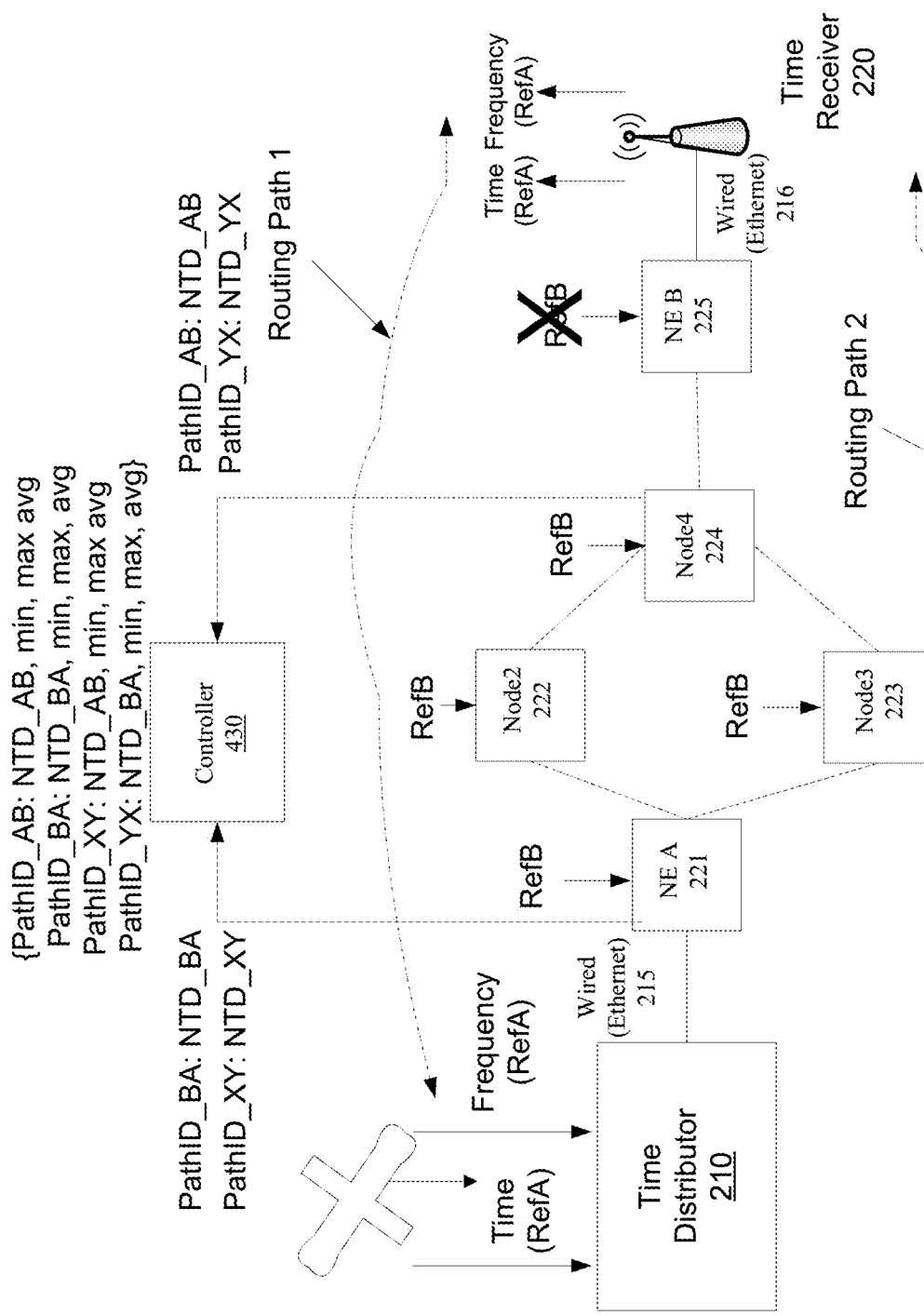
FIG. 8 shows a wireless mesh network that includes a time distributor, a time receiver, and a controller, wherein the controller determines a failure or degraded conditions of a network element between the time distributor and the time receiver, according to an embodiment.

FIG. 8 shows a wireless mesh network that includes a time distributor 210, a time receiver 220, and a controller 430, wherein the controller 430 determines a failure or degraded clock conditions of a network element 225 (indicated by an X over the RefB of the network element 225) between the time distributor 210 and the time receiver 220, according to an embodiment.

FIG. 9 is a flow chart that includes steps of a method of synchronizing the time receiver with the time distributor in a failure mode, wherein the failure includes clock degradation, a clock loss, or a rogue element, according to an embodiment. A first step 910 includes the controller detecting or being alerted by a network element of failure or degradation of the second clock (RefB) or a rogue clock. For an embodiment, the rogue clock is identified when the controller detects that a clock of one of the network element is behaving differently when compared to all other clocks of other network elements that the controller have visibility to. For example, when one of the clocks of a particular network element might be drifting compared to a plurality of network elements, or might be totally out of synchronization. The cause for such rogue clock could be due to jamming of satellite GPS signal.

A second step 920 includes activating and initiating synchronization with a peer network element. For an embodiment, a peer network element includes another network element that is directly connected to the failing network element and generally directly connected by a wireless link or a fiber link. If the initiating is performed by the controller, then a third step 930 includes the controller instructing the network element to engage in peer synchronization and selecting which of the network elements is the peer time distributor and which is the time follower. If the initiating is performed by the network element, a fourth step 940 includes the network element initiating in a peer discovery and selecting which of the network elements is the peer time distributor and which is the time follower. After peer synchronization has been completed, a fifth step 950 includes proceeding to normal operating mode as depicted in FIG. 6.

Link Failure, Network Element Failure, or Loss or Degradation of Common Time Reference (Second Clock (RefB))

For at least some embodiments, the controller 430 is operative to determine at least one of a failure of a link between network elements, a network element failure, or a failure of the second clock (refB) or a degradation of the second clock (refB) of a path between the time distributor and the time receiver, identify an alternate path between the time distributor 210 and the time receiver 220, and provide an indication to the time receiver 220. For an embodiment, the controller 430 operates to determine failure of a network element when the network element (such as, network element 225) stops responding to queries from the controller 430. For an embodiment, the network element informs the controller 430 at the onset of a failure by sending a special message (that is, dying gasp) to the controller 430. For an embodiment, the controller 430 is informed by the network of a link failure. This can be done by sending a message to the controller 430 with specific failure event identification and link identification. For an embodiment, the controller 430 is informed by another entity of a network or link failure. This can be done by a co-located routing engine in the controller 430 that has visibility to all paths across the network. For an embodiment, the controller 430 is informed of a clock failure or clock degradation from the network element. For an embodiment, this includes the network element sending a message to the controller 430 with specific failure event identification. Once the controller 430 is informed of any failure, the controller 430 can then try to find an alternative path, and if no alternative path is available, the controller 430 can directly inform the time receiver 220 or can instruct a network element about the failure. For an embodiment, this is performed by sending a message from the controller 430 (or network element instructed by the controller 430) with specific failure event identification.

For at least some embodiments, the controller 430 is further operative to determine that an internal clock (refB) of the egress node (such as, network element 225) is in a failed condition or in a degraded clock condition, identify an alternate synchronization path for the egress node, and provide an indication to the time receiver 220 of the compromised internal clock of the egress node when an alternate synchronization path cannot be identified. Such a failure condition can occur, for example, when the second clock (refB) at NE_B 225 becomes unavailable or is in a degraded condition, and the NE_B 225 informs the controller 430. For an embodiment, NE_B 225 sends a message such as 'Do not Use Me'. For an embodiment, the controller 430 then tries to identify an alternate path (for the purpose of time synchronization). If such path exists and is identified, then for an embodiment, the controller 430 informs the network element (NE_B 225) to source its synchronization using an alternative method (for example, using 2-way time transfer to an upstream node). For an embodiment, if no alternative path exists, then the controller 430 inform the network element (NE_B 225) to inform the time receiver 220 that a loss of the second clock (refB) has been detected. In such situation, the time receiver 220 can take a corrective action such as going into time holdover, or continuing to maintain time if an accurate frequency reference is available like Synchronous Ethernet, or rely on as a last resort on a fixed-delay network as explained below per a network de-jitter. For an embodiment, if the controller 430 is not available, the NE_B 225 autonomously chooses to source its synchronization using an alternative method, without controller instruction. For an embodiment, when the failure in a network element includes clock degradation, or a clock loss, the network element proceeds to activate peer network element synchronization shown and described in FIG. 9.

Rogue Common Time Reference

For at least some embodiments, the controller 430 is further operative to receive time representations from one or more of the plurality of network elements, inspect each of the received time representations, and inform each of the one or more of the plurality of network elements that have time representations that indicate an inconsistent or drifting time reference, or inform directly the time receiver that a neighbor network element has an inconsistent or a drifting time reference. For an embodiment, if the controller 430 determines there is a rogue network element, the controller 430 can select a new path between the time distributor 210 and the time receiver 220 to avoid the rogue network element that has the inconsistent or drifting time reference.

As previously described, if the controller 430 obtains information to indicate at least one of a failure of a link between network elements, a network element failure, or a failure of the second clock (refB), a degradation of the second clock (refB) of a path between the time distributor 210 and the time receiver 220, or an inconsistent or drifting time reference, the controller 430 may identify an alternate path for timing packets between the time distributor 210 and the time receiver 220 if available. Further, the controller 430 sends information to the network element, and the network element that send information to the time receiver 220 to let the time receiver 220 know of the issue, and the lack of an alternate path for timing packets between the time distributor 210 and the time receiver 220. Further, the controller 430 sends information direction to the time receiver 220. The time receiver 220 can then select to go into a holdover mode in which the time receiver 220 maintains its own time, or the time receiver 220 can opt to obtain synchronization from an adjacent receiver or network element.

For at least some embodiments, the controller 430 also detects network elements that might have a rogue second clock (refB) time value (or have indicated their loss of common reference through loss of signal). For an embodiment, for each delta t period, each network element sends their representation of time to the controller 430. The difference between these values should be consistent, given that all network elements have the same time reference (second clock (refB)). For an embodiment, the controller 430 inspects the time value and detects any element that might have inconsistent or outlier time values, or are drifting over time. For an embodiment, the controller 430 then informs the NE to communicate its status to the time receiver 220, or the controller 430 tries to find an alternative path across the network. For an embodiment, wherein a rogue element is detected, the network element proceeds to activate peer network element synchronization per FIG. 9.

Time Synchronization Via Air Interface

For at least some embodiments, the controller 430 further operative to receive time representations from one or more of the plurality of network elements, identify which of the one or more of the plurality of network elements have lost the second clock (refB) as a time reference, inform the one or more of the plurality of network elements have lost the second clock (refB) as a time reference to time synchronize with a peer network element. For at least some embodiments, the controller 430 may inform the one or more of the plurality of network elements that have lost the second clock (refB) as a time reference to time synchronize with a peer network element upon determining or detecting at least one of a failure of a link between network elements, a network element failure, or a failure of the second clock (refB), a degradation of the second clock (refB) of a path between the time distributor 210 and the time receiver 220, or an inconsistent or drifting time reference.

Figure 10:
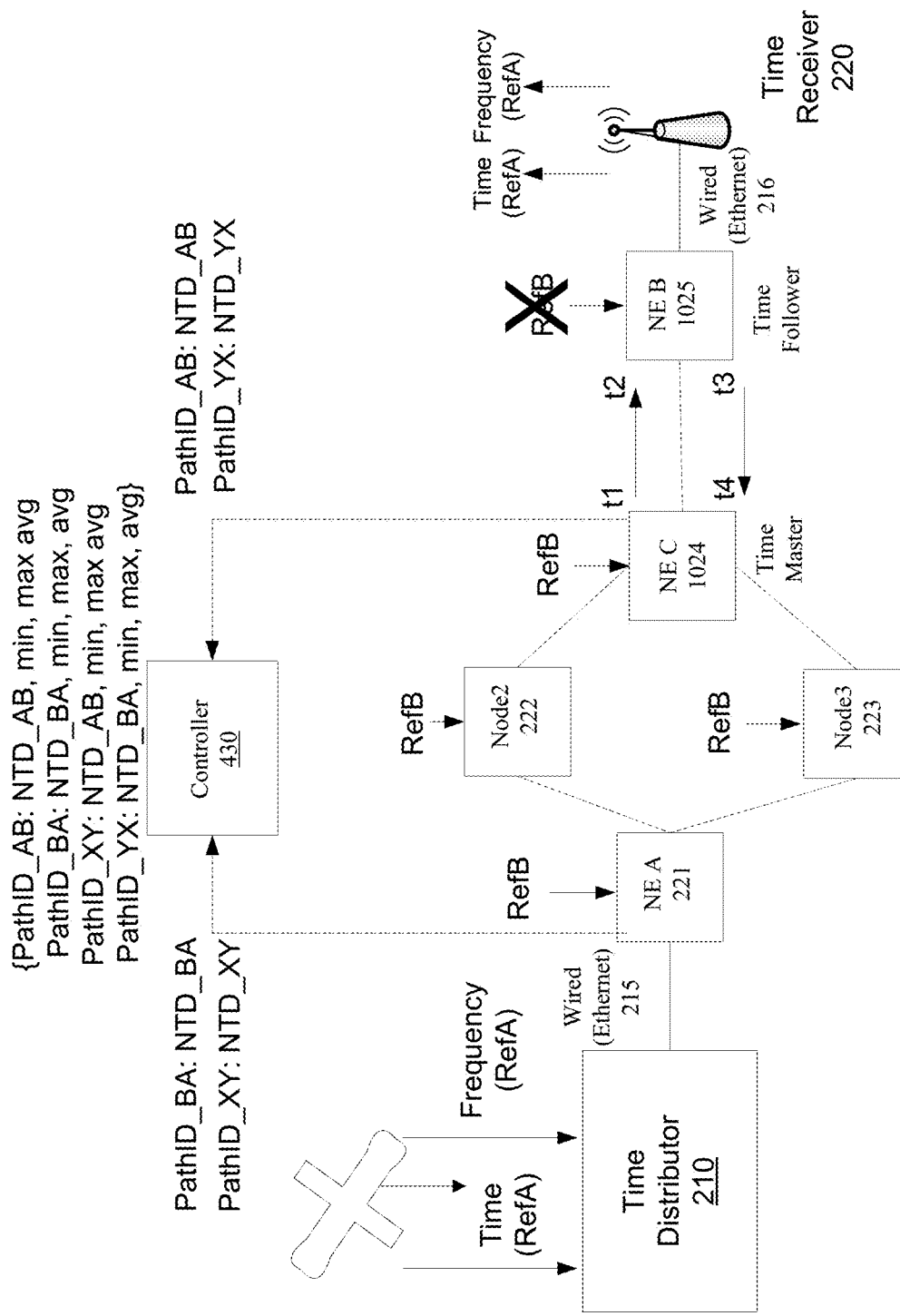
FIG. 10 shows a wireless mesh network that includes a time distributor, a time receiver, and a controller, wherein the controller determines a failure or degraded conditions of a network element between the time distributor and the time receiver, and further establishes synchronization between a peer time master network element and the failed or degraded network element, according to an embodiment.

FIG. 10 shows a wireless mesh network that includes a time distributor 210, a time receiver 220, and a controller 430, wherein the controller 430 determines a failure or degraded conditions of a network element 1025 between the time distributor 210 and the time receiver 220, and further establishes synchronization between a peer time master network element 1024 and the failed or degraded network element 1025, according to an embodiment. For at least some embodiments, when the network element, such as, network element NE_B 1025 loses its reference (second clock (RefB)), the network element NE_B 1025 change its state to become a time follower. In this situation, the controller 430 informs the network element NE_B 1025 to start synchronizing with a peer node (for example, peer node NE_C 1024) that still has access to common time reference (second clock (RefB)). For at least some embodiments, the controller 430 knows which network elements have access to the common time reference (second clock (RefB)). For at least some embodiments, the network element NE_B 1025 then initiates exchanging a 2-way time transfer with, for example, it's upstream network element node NE_C 1024 (the network element that the controller selected). The network element node NE_C 1024 has access to the common time reference (second clock (RefB)) and then acts as a peer time distributor. For at least some embodiments, the 2-way time transfer can be achieved using IEEE1588 but can also be performed via the exchange of timestamps (t1, t2, t3, t4). For at least some embodiments, the network element NE_B 1025 (time follower) can synchronize it's time clock across an air interface with network element node NE_C 1024 (time distributor). For at least some embodiments, an end-to-end time distribution between the time distributor and time receiver is still achieved given the loss of common time reference (second clock (RefB)) at the network element NE_B 1025. For at least some embodiments, the 2-way time transfer is applicable to any node (network element) in the network that loses its common time reference. Any node can still maintain synchronization with a peer node.

Asymmetry Correction

For at least some embodiments, the controller 430 is further operative to determine forward and backward latencies of one or more links between two or more of the plurality of network elements, determine asymmetries (time difference between) between the forward and backward latencies, maintain asymmetry statistics including a current asymmetry and a minimum asymmetry for the one or more links between the two or more of the plurality of network elements, determining when the one or more of the plurality of network elements loses reference to the second clock (refB), and provide the asymmetry statistics to the two or more of the plurality of network elements that loses the reference to the second clock. For at least some embodiments, the one or more of the plurality of network elements loses reference to the second clock (refB) are informed to synchronize with a peer node (network element). For an embodiment, the controller 430 specifically decides based on the asymmetry statistics which peer network element the one or more of the plurality of network elements that loses reference to the second clock (refB) should synchronize to. For at least some embodiments, the controller 430 provides the asymmetry information to the one or more of the plurality of network elements that loses reference to the second clock (refB). The one or more of the plurality of network elements that loses reference to the second clock (refB) use the asymmetry information and statistics in calculating timing with the peer node (network element), to compensate for the asymmetry, for example, by adding or subtracting an asymmetry value.

For at least some embodiments, during normal operating mode (no loss of common time reference), each link between each node (network element) can be continuously measured for asymmetry. This can be achieved by using synthetic packets that are used for the purpose of calculating latency between each of nodes (network elements), in both directions. For an embodiment, the latency is calculated as close to the medium (for example, air interface as possible) and are provided to the controller. This is again possible when a common time reference is available at both end points of each link. For an embodiment, the asymmetry is calculated by the controller on a per-link basis, given that the one-way delay measurements are provided. For an embodiment, the controller maintains over time the current asymmetry value and minimum asymmetry value observed in both directions of the links. When one of the network elements losses it's common time reference and uses air interface synchronization, the minimum asymmetry value can be provided for the purpose of correction, thereby improving accuracy and precision. For an embodiment, the controller 430 has visibility to the asymmetry values across all links and can also make an informed decision to better select the end-to-end path across the network.

Network De-Jitter for Legacy Time Receiver

Figure 11:
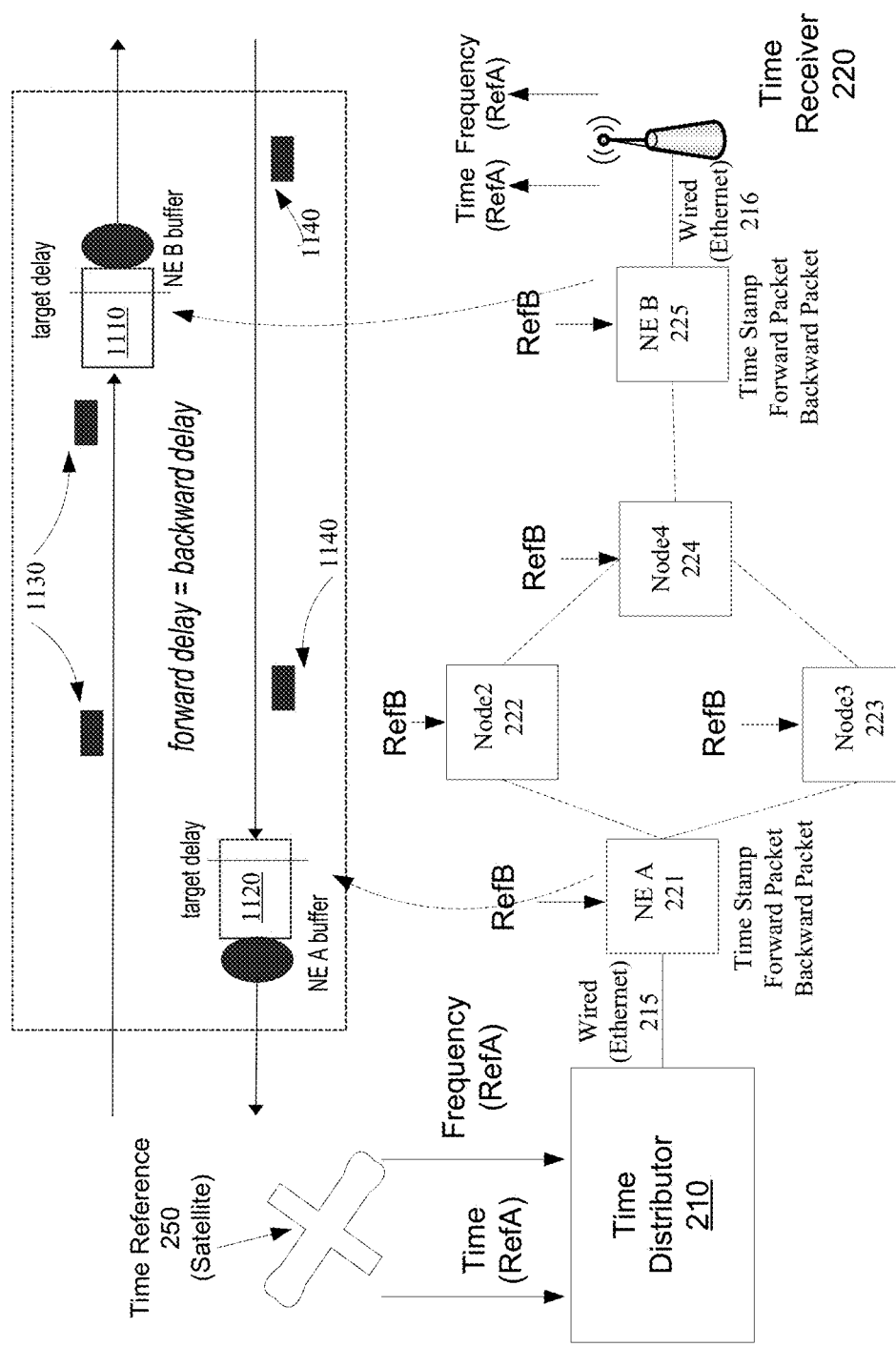
FIG. 11 shows a wireless mesh network that includes a time distributor and a time receiver, wherein network elements between the time receiver and the time distributor include buffers to reduce jitter between forward and backward transit delays, according to an embodiment.

FIG. 11 shows a wireless mesh network that includes a time distributor 210 and a time receiver 220, wherein network elements between the time receiver and the time distributor include buffers 1110, 1120 to reduce jitter between forward and backward transit delays, according to an embodiment. For at least some embodiments, the controller is further operative to maintain delay statistics of a forward transit delay and a backward transit delay for forward and backward paths between the time distributor 210 and the time receiver 220, define a target delay for each forward and backward path between the time distributor 210 and the time receiver 220, and induce delay on timing packets 1130, 1140 to create a fixed-delay path based on the target delay on each forward and backward path. For at least some embodiments, the goal is to make the network appear as a fixed-delay network (any path between two endpoints has the same delay in both direction). For an embodiment, this includes the de-jitter buffers 1110, 1120 in both forward and backward directions. For an embodiment, the controller has visibility of all paths and latency statistics in all directions. For an embodiment, the de-jitter buffers 1110, 1120 are used to artificially induce latency such that the delay and delay variation in both directions is equal to a configured target delay determined by the controller.

FIG. 12 is a flow chart that includes steps of a method of time distribution across a wireless network, according to an embodiment. A first step 1210 includes providing, by a plurality of network elements, one or more network connections between a time distributor and a time receiver, the plurality of network elements including an ingress network element and an egress network element. A second step 1220 includes receiving and synchronizing, by the time distributor, to a first clock. A third step 1230 includes receiving and synchronizing, by two or more of the plurality of network elements, to a second clock. A fourth step 1240 includes determining a forward network transit delay between the ingress network element and the egress network element. A fifth step 1250 includes determining a backward network transit delay between the egress network element and the ingress network element. A sixth step 1260 includes time synchronizing the time receiver to the time distributor using the forward network transit delay and the backward network transit delay.

For at least some embodiments, the forward network transit delay is determined by determining a time difference between a first ingress time stamp of the ingress network element and a first egress time stamp of the egress network element; and the backward network transit delay is determined by determining a time difference between a second egress time stamp of the egress network element and a second ingress time stamp of the ingress network element. At least some embodiments further include communicating, by the time distributor, a packet to the ingress network element of the plurality of network elements, stamping, by the ingress network element time, the packet with the ingress time stamp based on the second clock, wherein the packet with the ingress time stamp is communicated to the egress network element, and wherein the egress network element of the plurality of network elements generates the egress time stamp based on the second clock. At least some embodiments further include stamping, by the egress network element time, a packet with the second egress time stamp based on the second clock, wherein the packet with the second egress time stamp is communicated to the ingress network element, and wherein the ingress network element of the plurality of network elements generates the second ingress time stamp based on the second clock.

At least some embodiments further include receiving, by a controller, a plurality of forward transit delays, and receiving, by the controller, a plurality of backward transit delays. At least some embodiments include maintaining, by the controller, statistics of the plurality of forward transit delays and the plurality of backward transit delays. For at least some embodiments, the statistics maintained by the controller include at least a forward path identification, a minimum forward transit delay, a maximum forward transit delay, an average forward transit delay, backward path identification, a minimum backward transit delay, a maximum backward transit delay, or an average backward transit delay.

At least some embodiments further include receiving, by the controller, the plurality of forward transit delays for a plurality of paths between the ingress network element and the egress network element, receiving, by the controller, the plurality of backward transit delays for a plurality of paths between the egress network element and the ingress network element, and maintaining, by the controller, statistics of the plurality of forward transit delays and the plurality of backward transit delays for the plurality of paths between the ingress network element and the egress network element and the plurality of paths between the egress network element and the ingress network element. At least some embodiments further include selecting, by the controller, forward and backward paths between the ingress network element and the egress network element based on at least one of the maintained statistics of the plurality of forward transit delays and the plurality of backward transit delays for the plurality of paths between the ingress network element and the egress network element and the plurality of paths between the egress network element and the ingress network element. For at least some embodiments, the maintained statistics include one or more of a minimum forward transit delay, a maximum forward transit delay, a minimum backward transit delay, a maximum backward transit delay, path availability, forward transit delay variability, a backward transit delay variability. For at least some embodiments, the forward path is disjointed from the backward path.

At least some embodiments further include determining at least one of a failure of a link between network elements, a network element failure, or a failure of the second clock or a degradation of the second clock of a path between the time distributor and the time receiver, identifying an alternate path for timing packets between the time distributor and the time receiver, and providing an indication to the time receiver.

At least some embodiments further include determining that an internal clock of the egress node is in a failed condition or in a degraded clock condition, identifying an alternate synchronization path for the egress node, and providing an indication to the time receiver of the compromised internal clock of the egress node when an alternate synchronization path cannot be identified.

At least some embodiments further include receiving, by the controller, time representations from one or more of the plurality of network elements, inspecting, by the controller, each of the received time representations, and informing, by the controller, each of the one or more of the plurality of network elements that have time representations that indicate an inconsistent or drifting time reference, or inform directly the time receiver that a neighbor network element has an inconsistent or a drifting time reference.

At least some embodiments further include receiving, by the controller, time representations from one or more of the plurality of network elements, identifying, by the controller, which of the one or more of the plurality of network elements have lost the second clock as a time reference, and informing, by the controller, the one or more of the plurality of network elements have lost the second clock as a time reference to time synchronize with a peer network element.

At least some embodiments further include maintaining delay statistics of a forward transit delay and a backward transit delay for forward and backward paths between the time distributor and the time receiver, defining a target delay for each forward and backward path between the time distributor and the time receiver, and inducing delay on timing packets to create a fixed-delay path based on the target delay on each forward and backward path.

Although specific embodiments have been described and illustrated, the embodiments are not to be limited to the specific forms or arrangements of parts so described and illustrated. The described embodiments are to only be limited by the claims.

What is claimed:

1. A network, comprising:
   a time distributor,
   a time receiver,
   a plurality of network elements providing one or more network connections between the time distributor and the time receiver, the plurality of network elements including an ingress network element and an egress network element;
   wherein the time distributor receives and synchronizes to a first clock, and wherein two or more of the plurality of network elements receives and synchronize to a second clock;
   wherein a forward network transit delay is determined between the ingress network element and the egress network element and a backward network transit delay is determined between the egress network element and the ingress network element; and
   wherein the time receiver time synchronizes to the time distributor using the forward network transit delay and the backward network transit delay.

2. The network of claim 1, wherein
   wherein the forward network transit delay is determined by determining a time difference between a first ingress time stamp of the ingress network element and a first egress time stamp of the egress network element; and
   wherein the backward network transit delay is determined by determining a time difference between a second egress time stamp of the egress network element and a second ingress time stamp of the ingress network element.

3. The network of claim 2, wherein
   the time distributor communicates a packet to the ingress network element of the plurality of network elements;
   the ingress network element time stamps the packet with the ingress time stamp based on the second clock,
   wherein the packet with the ingress time stamp is communicated to the egress network element; and
   wherein the egress network element of the plurality of network elements generates the egress time stamp based on the second clock.

4. The network of claim 2, wherein
   the egress network element time stamps a packet with the second egress time stamp based on the second clock;
   wherein the packet with the second egress time stamp is communicated to the ingress network element; and
   wherein the ingress network element of the plurality of network elements generates the second ingress time stamp based on the second clock.

5. The network of claim 1, further comprising a controller, wherein the controller is operative to:
   receive a plurality of forward transit delays; and
   receive a plurality of backward transit delays.

6. The network of claim 5, wherein the controller is operative to:
   maintain statistics of the plurality of forward transit delays and the plurality of backward transit delays.

7. The network of claim 6, wherein the statistics maintained by the controller include at least a forward path identification, a minimum forward transit delay, a maximum forward transit delay, an average forward transit delay, backward path identification, a minimum backward transit delay, a maximum backward transit delay, or an average backward transit delay.

8. The network of claim 5, wherein the controller is further operative to:
   receive the plurality of forward transit delays for a plurality of paths between the ingress network element and the egress network element;
   receive the plurality of backward transit delays for a plurality of paths between the egress network element and the ingress network element; and
   maintain statistics of the plurality of forward transit delays and the plurality of backward transit delays for the plurality of paths between the ingress network element and the egress network element and the plurality of paths between the egress network element and the ingress network element.

9. The network of claim 8, wherein the controller is further operative to:
   select forward and backward paths between the ingress network element and the egress network element based on at least one of the maintained statistics of the plurality of forward transit delays and the plurality of backward transit delays for the plurality of paths between the ingress network element and the egress network element and the plurality of paths between the egress network element and the ingress network element.

10. The network of claim 9, wherein the maintained statistics include one or more of a minimum forward transit delay, a maximum forward transit delay, a minimum backward transit delay, a maximum backward transit delay, path availability, forward transit delay variability, a backward transit delay variability.

11. The network of claim 9, wherein the forward path is disjointed from the backward path.

12. The network of claim 8, wherein the controller is further operative to:
   determine at least one of a failure of a link between network elements, a network element failure, or a failure of the second clock or a degradation of the second clock of a path between the time distributor and the time receiver;
   identify an alternate path between the time distributor and the time receiver; and
   provide an indication to the time receiver.

13. The network of claim 8, wherein the controller is further operative to:
   determine that an internal clock of the egress node is in a failed condition or in a degraded clock condition;
   identify an alternate synchronization path for the egress node; and
   provide an indication to the time receiver of the compromised internal clock of the egress node when an alternate synchronization path cannot be identified.

14. The network of claim 8, wherein the controller is further operative to:
  receive time representations from one or more of the plurality of network elements;
  inspect each of the received time representations; and
  inform each of the one or more of the plurality of network elements that have time representations that indicate an inconsistent or drifting time reference, or inform directly the time receiver that a neighbor network element has an inconsistent or a drifting time reference.

15. The network of claim 8, wherein the controller is further operative to:
  receive time representations from one or more of the plurality of network elements;
  identify which of the one or more of the plurality of network elements have lost the second clock as a time reference; and
  inform the one or more of the plurality of network elements have lost the second clock as a time reference to time synchronize with a peer network element.

16. The network of claim 8, wherein the controller is further operative to:
  maintain delay statistics of a forward transit delay and a backward transit delay for forward and backward paths between the time distributor and the time receiver;
  define a target delay for each forward and backward path between the time distributor and the time receiver; and
  induce delay on timing packets to create a fixed-delay path based on the target delay on each forward and backward path.

17. A method, comprising:
  providing, by a plurality of network elements, one or more network connections between a time distributor and a time receiver, the plurality of network elements including an ingress network element and an egress network element;
  receiving and synchronizing, by the time distributor, to a first clock,
  receiving and synchronizing, by two or more of the plurality of network elements, to a second clock;
  determining a forward network transit delay between the ingress network element and the egress network element;
  determining a backward network transit delay between the egress network element and the ingress network element; and
  time synchronizing the time receiver to the time distributor using the forward network transit delay and the backward network transit delay.

18. The method of claim 17, further comprising:
  receiving, by a controller, a plurality of forward transit delays for a plurality of paths between the ingress network element and the egress network element;
  receiving, by the controller, a plurality of backward transit delays for a plurality of paths between the egress network element and the ingress network element;
  maintaining statistics of the plurality of forward transit delays and the plurality of backward transit delays for the plurality of paths between the ingress network element and the egress network element and the plurality of paths between the egress network element and the ingress network element; and
  selecting forward and backward paths between the ingress network element and the egress network element based on at least one the maintained statistics of the plurality of forward transit delays and the plurality of backward transit delays for the plurality of paths between the ingress network element and the egress network element and the plurality of paths between the egress network element and the ingress network element.

19. The method of claim 17, further comprising
  determining at least one of a failure of a link between network elements, a network element failure, or a failure of the second clock or a degradation of the second clock of a path between the time distributor and the time receiver;
  identifying an alternate path between the time distributor and the time receiver; and
  providing an indication to the time receiver.

20. The method of claim 17, further comprising
  maintaining delay statistics of a forward transit delay and a backward transit delay for forward and backward paths between the time distributor and the time receiver;
  defining a target delay for each forward and backward path between the time distributor and the time receiver; and
  inducing delay on timing packets to create a fixed-delay path based on the target delay on each forward and backward path.

* * * * *